(12) United States Patent
Harrington, Jr.

(10) Patent No.: US 7,820,237 B2
(45) Date of Patent: Oct. 26, 2010

(54) SYSTEM FOR MANUFACTURING A GRANULE COVERED ROOFING SHINGLE HAVING A NATIONAL SHINGLE COLOR

(75) Inventor: Edward R. Harrington, Jr., Toledo, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 981 days.

(21) Appl. No.: 11/245,548

(22) Filed: Oct. 6, 2005

(65) Prior Publication Data

US 2007/0107372 A1    May 17, 2007

(51) Int. Cl.
*B05D 1/00*    (2006.01)
(52) U.S. Cl. .................................. 427/188; 427/186
(58) Field of Classification Search .............. 427/186, 427/188
See application file for complete search history.

(56) References Cited

U.S. PATENT DOCUMENTS

| | | | |
|---|---|---|---|
| 1,584,557 A | 5/1926 | Koch | |
| 2,982,445 A | 5/1961 | Koble | |
| 4,850,304 A | 7/1989 | Nicholson | |
| 5,356,664 A * | 10/1994 | Narayan et al. | 427/186 |
| 5,382,475 A * | 1/1995 | Kayser | 428/403 |
| 5,666,776 A | 9/1997 | Weaver et al. | |
| 5,795,389 A | 8/1998 | Koschitzky | |
| 6,238,794 B1 | 5/2001 | Beesley et al. | |
| 6,289,648 B1 | 9/2001 | Freshwater et al. | |
| 6,487,828 B1 | 12/2002 | Phillips | |
| 6,610,147 B2 | 8/2003 | Aschenbeck | |
| 2002/0160151 A1 | 10/2002 | Pinault et al. | |
| 2003/0040241 A1 | 2/2003 | Kiik et al. | |
| 2006/0251807 A1 * | 11/2006 | Hong et al. | 427/212 |

* cited by examiner

*Primary Examiner*—Frederick J Parker
(74) *Attorney, Agent, or Firm*—MacMillan, Sobanski & Todd, LLC

(57) ABSTRACT

A system for manufacturing a granule covered roofing shingle includes establishing at least two sources of granules. A standardized process for manufacturing granules having a standardized appearance is then established, wherein a color of the granules from one of the sources of granules is substantially identical to the color of the granules from the others of the sources of granules, thereby defining at least one standardized granule color. Granules of the standardized granule color are then manufactured according to the standardized process. The manufactured granules are transported to at least one shingle manufacturing facility, and granule covered roofing shingles are then manufactured using the manufactured granules of the standardized granule color.

10 Claims, 3 Drawing Sheets

SYSTEM FOR MANUFACTURING A GRANULE COVERED ROOFING SHINGLE HAVING A NATIONAL SHINGLE COLOR

TECHNICAL FIELD

This invention relates to the manufacture of shingles, such as roofing shingles, and in particular, to shingles having blend drops of granules of various shades of color. More particularly, this invention pertains to an improved system for manufacturing such a shingle.

BACKGROUND OF THE INVENTION

Asphalt-based roofing materials, such as roofing shingles, roll roofing and commercial roofing, are installed on the roofs of buildings to provide protection from the elements, and to give the roof an aesthetically pleasing look. Typically, the roofing material is constructed of a substrate such as a glass fiber mat or an organic felt, an asphalt coating on the substrate, and a surface layer of granules embedded in the asphalt coating.

A common method for the manufacture of asphalt shingles is the production of a continuous sheet of asphalt material followed by a shingle cutting operation which cuts the material into individual shingles. In the production of asphalt sheet material, either a glass fiber mat or an organic felt mat is passed through a coater containing hot liquid asphalt to form a tacky, asphalt coated sheet. Subsequently, the hot asphalt coated sheet is passed beneath one or more granule applicators which discharge protective and decorative surface granules onto portions of the asphalt sheet material.

In the manufacture of colored shingles, two types of granules are typically employed. Headlap granules are granules of relatively low cost used for the portion of the shingle that will be covered up on the roof. Colored granules or prime granules are of relatively higher cost and are applied to the portion of the shingle that will be exposed on the roof.

Colored granules are typically colored with a ceramic coating at a granule quarry and transported to a shingle manufacturing facility. Colored granules from different granule quarries are not used interchangeably at shingle manufacturing facilities. The colored granules from different granule quarries are not interchangeable because shingles made therefrom do not appear identical to the customer when used side-by-side on a roof.

To provide a color pattern of pleasing appearance, the colored portion of the shingles may be provided with areas of different colors. Usually the shingles have a background color and a series of granule deposits of different colors or different shades of the background color. A common method for manufacturing the shingles is to discharge blend drops onto spaced areas of the tacky, asphalt coated sheet. Background granules are then discharged onto the sheet and they adhere to the tacky, asphalt coated areas of the sheet between the granule deposits formed by the blend drops. The term "blend drop," as used herein, refers to the flow of granules of different colors or different shades of color (with respect to the background color) that is discharged from a granule blend drop applicator onto the asphalt coated sheet. The patch or assemblage of the blend drop granules on the asphalt coated sheet is also referred to as the "blend drop."

The apparatus for depositing granules onto the asphalt coated sheet is referred to as a blender, which can be comprised of a series of hoppers positioned to drop granules onto the sheet. In a typical blend drop shingle operation, the blender includes four hoppers that periodically deposit blend drops of granules of four different shades. The blender also includes a fifth hopper that drops background granules on the areas of the asphalt coated sheet that have not been covered by granules from the first four hoppers.

Various types of granule dispensing hoppers are known for use in granule blenders. One type of dispensing hopper is a fluted roll. Another type is a pneumatically assisted and controlled hopper as disclosed in U.S. Pat. No. 5,520,889 to Burton et al. Since the manufacture of shingles is carried out at high, continuous line speeds of hundreds of feet per minute, coordination and timing for the granule deposits from the various hoppers is imperative. The blender is usually operated by an electronic blender controller that provides signals to the various granule hoppers to impart the proper sequencing and duration of the blend drops of each blend drop color, and of the background color.

The various shades or colors of granules in each of the hoppers are typically created by mixing colored granules of different colors from several different supplies of granules, each of which is a pure or single color. For example, the first blend drop may be made by mixing three parts pure brown granules and one part pure black granules. The second blend drop may be made by mixing four parts pure brown granules and two parts pure white granules. Other combinations may be used for the third and fourth blend colors. The fifth hopper may contain background granules that are a color reflecting a combination of the granules from the first four hoppers.

One of the problems associated with the manufacture of shingles with blend drops is that the shade or color can deviate from the designed shade or color, and therefore be out of specification. This can occur because of mixing of colored granules from different granule quarries. Sometimes defects or variations in shades or colors cannot be detected during the manufacturing of the shingles. In such cases, the defect may not be discovered until the shingles are actually installed on a roof. As a result, shingle manufacturers often implement do not mix programs, wherein shingle manufacturing facilities are instructed not to mix like-colored granules from different quarries, and shingle customers are instructed not to mix shingles produced at different manufacturing facilities and/or on different production lines. It would be advantageous if there could be developed an improved system for manufacturing colored shingles.

SUMMARY OF THE INVENTION

The present invention relates to a system for manufacturing a granule covered roofing shingle. The system includes establishing at least two sources of granules. A standardized process for manufacturing granules having a standardized appearance is then established, wherein a color of the granules from one of the sources of granules is substantially identical to the color of the granules from the others of the sources of granules, thereby defining at least one standardized granule color. Granules of the standardized granule color are then manufactured according to the standardized process. The manufactured granules are transported to at least one shingle manufacturing facility, and granule covered roofing shingles are then manufactured using the manufactured granules of the standardized granule color.

According to this invention, there is also provided a system for processing granules for use in a manufacturing process. The system includes establishing at least two sources of granules. A standardized process for manufacturing granules having a standardized appearance is established, wherein a color of the granules from one of the sources of granules is substantially identical to the color of the granules from the others of the sources of granules, thereby defining at least one standardized granule color. Granules of the standardized granule color are then manufactured according to the standardized process, and the manufactured granules from each of the at least two sources of granules are used interchangeably.

According to this invention, there is also provided a system for providing granule covered roofing shingles for use on a roof. The system includes establishing at least two sources of granules. A standardized process for manufacturing granules having a standardized appearance is established, wherein a color of the granules from one of the sources of granules is substantially identical to the color of the granules from the others of the sources of granules, thereby defining at least one standardized granule color. Granules of the standardized granule color are manufactured according to the standardized process. A first granule covered roofing shingle is manufactured using the manufactured granules from one of the sources of granules, and a second granule covered roofing shingle is manufactured using the manufactured granules from a second one of the sources of granules. The first granule covered roofing shingle and the second granule covered roofing shingle are then used interchangeably on a roof.

According to this invention, there is also provided a system for manufacturing a granule covered roofing shingle. The system includes establishing at least two sources of granules and transporting the granules to at least one shingle manufacturing facility. The granules from one of the sources of granules are used to define a first blend drop, and the granules from the other of the sources of granules are used to define a second blend drop. A first granule covered roofing shingle is manufactured using the first blend drop, and a second granule covered roofing shingle is manufactured using the second blend drop, wherein the first granule covered roofing shingle has an appearance substantially identical to the appearance of the second granule covered roofing shingle.

Various objects and advantages of this invention will become apparent to those skilled in the art from the following detailed description of the various embodiments, when read in light of the accompanying drawings.

DETAILED DESCRIPTION OF THE INVENTION

Figure 1:
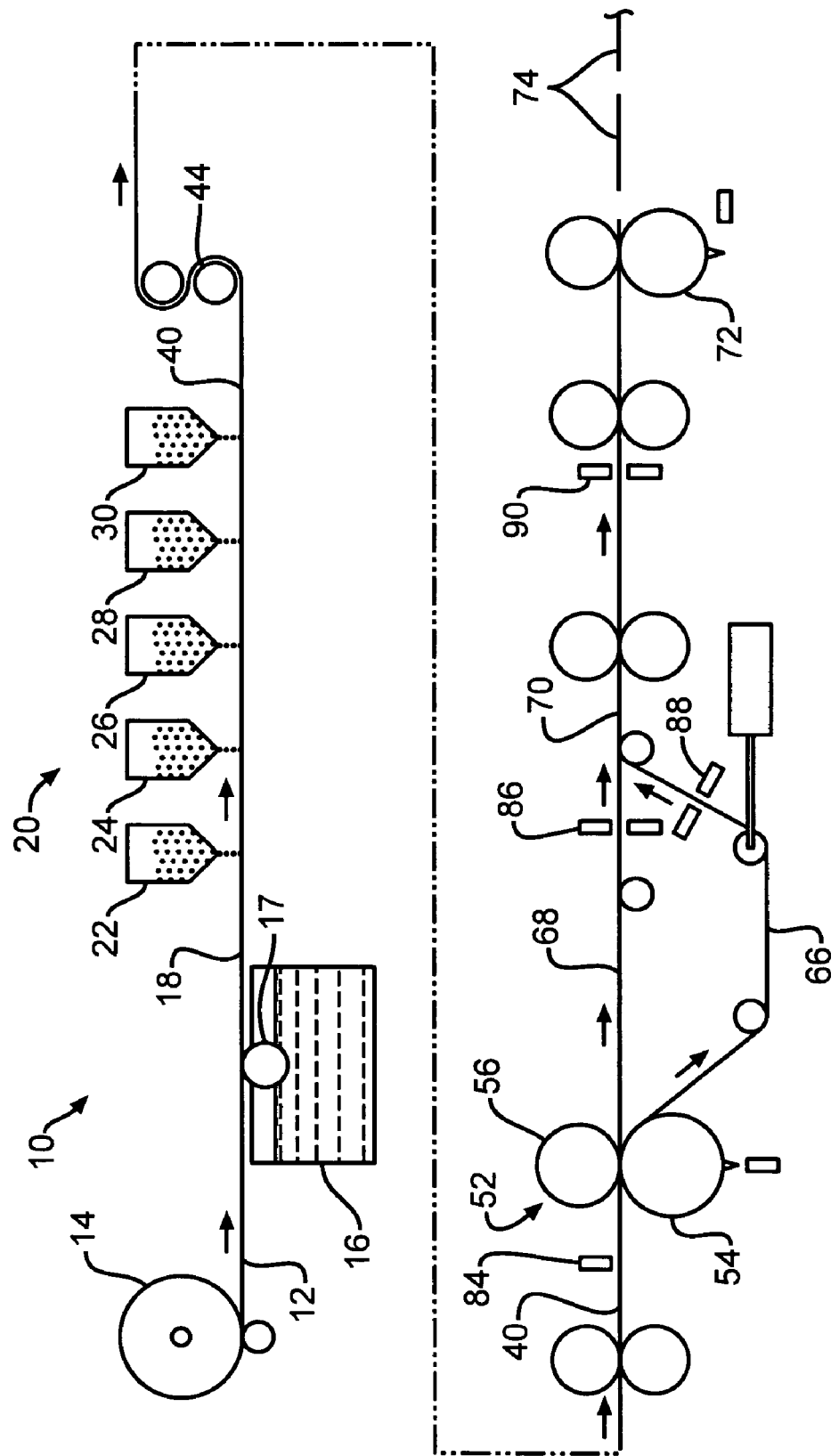
FIG. 1 is a schematic elevational view of an apparatus for making shingles according to the invention.

Referring now to the drawings, there is shown in FIG. 1 an apparatus 10 for manufacturing an asphalt-based roofing material according to the invention. The illustrated manufacturing process involves passing a continuous sheet 12 in a machine direction (indicated by the arrows) through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute).

In a first step of the manufacturing process, a continuous sheet of substrate or shingle mat 12 is payed out from a roll 14. The substrate can be any type known for use in reinforcing asphalt-based roofing materials, such as a non-woven web of glass fibers. The shingle mat 12 is fed through a coater 16 where an asphalt coating is applied to the mat 12. The asphalt coating can be applied in any suitable manner. In the illustrated embodiment, the mat 12 contacts a roller 17, which is in contact with a supply of hot, melted asphalt. The roller 17 completely covers the mat 12 with a tacky coating of hot, melted asphalt. However, in other embodiments, the asphalt coating could be sprayed on, rolled on, or applied to the sheet by other means. Typically, the asphalt material is highly filled with a ground stone filler material, amounting to at least about 60 percent by weight of the asphalt/filler combination.

The resulting asphalt coated sheet 18 is then passed beneath a series of granule dispensers 20 for the application of granules to the upper surface of the asphalt coated sheet. The granule dispensers can be of any type suitable for depositing granules onto the asphalt coated sheet. A granule dispenser that can be used is a granule blender of the type disclosed in U.S. Pat. No. 5,599,581 to Burton et al., which is hereby incorporated by reference, in its entirety. The initial granule blender 22 deposits partial blend drops of background granules of a first color blend on the tab portion of the asphalt coated sheet 18 in a pattern that sets or establishes the trailing edge of subsequent blend drops of a second color blend (of an accent color) and a third color blend (of a different accent color). For purposes of this patent application, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult. This technique of using initially applied partial blend drops is disclosed in U.S. Pat. No. 5,405,647 to Grubka et al., which is hereby incorporated by reference, in its entirety.

As is well known in the art, blend drops applied to the asphalt coated sheet are often made up of granules of several different colors. For example, one particular blend drop that is supposed to simulate a weathered wood appearance might actually consist of some brown granules, some dark gray granules, and some light gray granules. When these granules are mixed together and applied to the sheet in a generally uniformly mixed manner, the overall appearance of weathered wood is achieved. For this reason, the blend drops are referred to as having a color blend, which gives an overall color appearance. This overall appearance may be different from any of the actual colors of the granules in the color blend. Also, blend drops of darker and lighter shades of the same color, such as, for example, dark gray and light gray, are referred to as different color blends rather than merely different shades of one color.

As shown in FIG. 1, the series of dispensers 20 includes four color blend blenders 22, 24, 26, and 28. However, any desired number of blenders can be used. The final blender may be the background blender 30. Each of the blenders may be supplied with granules from sources of granules, not shown. After the blend drops are deposited on the asphalt coated sheet 18, the remaining, uncovered areas are still tacky with warm, uncovered asphalt, and the background granules from background blender 30 will adhere to the areas that are not already covered with blend drop granules. After all the granules are deposited on the asphalt coated sheet 18 by the series of dispensers 20, the sheet 18 becomes a granule covered sheet 40.

The granule covered sheet 40 is then turned around a slate drum 44 to press the granules into the asphalt coating and to temporarily invert the sheet so that the excess granules will fall off and will be recovered and reused. Typically, the granules applied by the background blender 30 are made up by collecting the backfall granules falling from the slate drum 44.

The granule covered sheet 40 is subsequently fed through a rotary pattern cutter 52 which includes a bladed cutting cylinder 54, backup roll 56, and a motor 58, as shown in FIG. 1. If desired, the pattern cutter 52 can cut a series of cutouts in the tab portion of the granule covered sheet 40, and also cut a series of notches in the underlay portion of the granule covered sheet 40.

The pattern cutter 52 also cuts the granule covered sheet 40 into a continuous underlay sheet 66 and a continuous overlay sheet 68. The underlay sheet 66 is directed to be aligned beneath the overlay sheet 68, and the two sheets are laminated together to form a continuous laminated sheet 70. As shown in FIG. 1, the continuous underlay sheet 66 is routed on a longer path than the path of the continuous overlay sheet 68. Further downstream, the continuous laminated sheet 70 is passed into contact with a rotary length cutter 72 that cuts the laminated sheet into individual laminated shingles 74.

In order to facilitate synchronization of the cutting and laminating steps, various sensors and controls can be employed. For example, sensors, such as photo eyes 86 and 88 can be used to synchronize the continuous underlay sheet 66 with the continuous overlay sheet 68. Sensors 90 can also be used to synchronize the notches and cutouts of the continuous laminated sheet with the end cutter or length cutter 72. While generally described in the context of a laminate shingle, the present invention may be adapted to be used to manufacture a strip shingle, as generally described in commonly assigned U.S. Pat. No. 6,487,828, which is incorporated herein by reference in its entirety.

Figure 2:
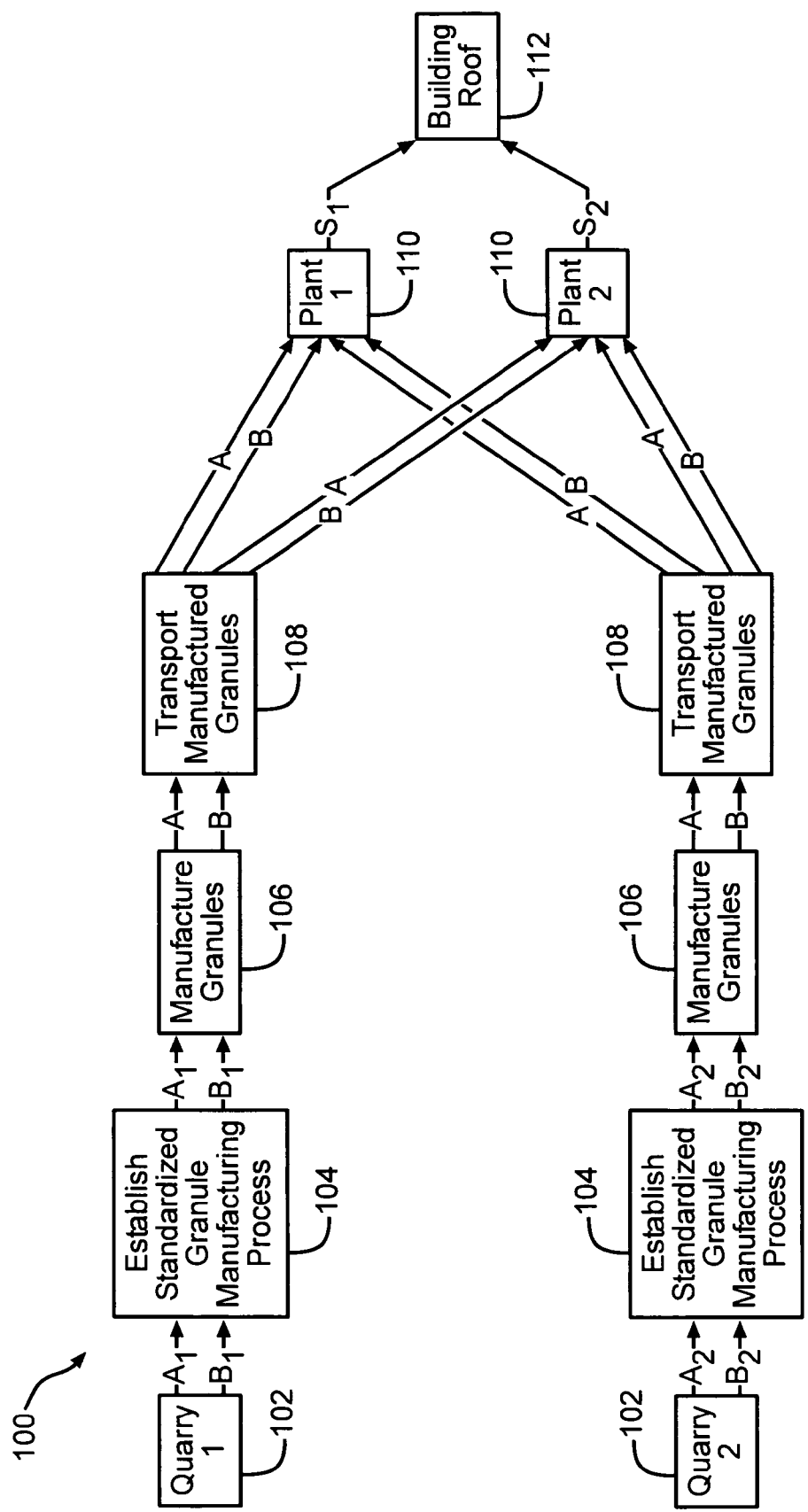
FIG. 2 is a flow chart of a first embodiment of a system for manufacturing a granule covered roofing shingle in accordance with the system of this invention.

Referring now to FIG. 2, there is illustrated a flow chart of a system, indicated generally at 100, for manufacturing a granule covered roofing shingle in accordance with this invention. In a first step 102 of the system 100, at least two sources of granules are established. The sources of granules may be geographically separated granule quarries, such as quarries in different geographic regions of the United States, or different geographic regions of the world. However, the sources of granules may be any other desired source of a suitable granule. Additionally, although the sources of granules illustrated in FIG. 2 are shown as being geographically separated granule quarries (labeled Quarry 1 and Quarry 2 in FIG. 2), the sources of granules may also be different portions of the same quarry, or any desired number of geographically separated quarries, or portions thereof. It will be understood however, that Quarry 1 and Quarry 2 can provide any desired number of granules from any desired number of quarries, such as one granule or more than two granules, and more than two quarries. In the embodiment illustrated in FIG. 2, Quarry 1 provides a first granule $A_1$ and a second granule $B_1$, and Quarry 2 provides a first granule $A_2$ and a second granule $B_2$, wherein the first granules $A_1$ and $A_2$ are of a first color, and the second granules $B_1$ and $B_2$ are of a second color.

Prime granules for use on shingles are typically made by quarrying rock, crushing and grading the rock to a particular particle size, and then coating the rock with a ceramic coating. It is the ceramic coating that can be colored to impart the desired color to the granules. For various reasons, granules of the same nominal color from different quarries are not always identical or interchangeable. For example, brown granules from two different quarries might not be the same shade when the granules are used to make shingles.

In a second step 104 of the system 100, a standardized process for manufacturing the granules $A_1$, $B_1$, $A_2$, and $B_2$ may be established to provide manufactured granules having a standardized appearance. The appearance of each of the granules $A_1$, $B_1$, $A_2$, and $B_2$ may be standardized so that the color of the first granule $A_1$ is substantially identical to the color of the first granule $A_2$, and the color of the second granule $B_1$ is substantially identical to the color of the second granule $B_2$, thereby defining manufactured granules A and B, respectively, as will be described in detail. It will be understood that the manufactured granules A and B each define a standardized granule color.

The standardized process for manufacturing granules, such as the granules $A_1$, $A_2$, $B_1$, and $B_2$, with a standardized appearance to define the respective manufactured granules A and B, each having a standardized granule color, can be accomplished by any desired method. For example, to ensure that the color of the first granule $A_1$ from Quarry 1 is substantially identical to the color of the first granule $A_2$ from Quarry 2, a color having a predetermined uniform color scale value, such as a predetermined L*a*b* color scale value (as defined using the CIELAB color space standard) can be selected. As used herein, when a color is expressed according to the CIELAB color space standard, L*=lightness, a*=the red/green value, and b*=the yellow/blue value.

A color measuring device, such as a colorimeter, can be used to sense the first granules $A_1$ and $A_2$ to ensure that they are substantially identical. As used herein, the color of the first granules $A_1$ and $A_2$ will be considered substantially identical if the total color difference ΔE between the first granules $A_1$ and $A_2$ is within the range of about +/−2.5 L*a*b* color units, wherein:

$$\Delta E=[(\Delta L^2)+(\Delta a^2)+\Delta b^2)]^{1/2}.$$

In a particular embodiment, the ΔE between the colors of the first granules $A_1$ and $A_2$ is within the range of about +/−1.5 L*a*b* color units. In another embodiment, the ΔE between the colors of the first granules $A_1$ and $A_2$ is within the range of about +/−1.0 L*a*b* color unit.

Additionally, an observer test can be used to ensure that the color of a shingle having the first granule $A_1$ from Quarry 1 is substantially identical to the color of a shingle having the first granule $A_2$ from Quarry 2. In such an observer test, samples of shingles having the first granules $A_1$ and $A_2$ can be visually observed by an observer to ensure that the color of a shingle having the first granule $A_1$ from Quarry 1 is substantially identical to the color of a shingle having the first granule $A_2$ from Quarry 2.

The third step 106 of the system 100 may include manufacturing each of the manufactured granules A and B. As will be understood by a person skilled in the roofing shingle art, the manufactured granules A and B can be manufactured by applying a desired coating, such as a ceramic coating, to the granules $A_1$, $B_1$, $A_2$, and $B_2$ to thereby define the manufactured granules A and B having the standardized granule color according to the standardized process, as described herein above.

In a fourth step 108 of the system 100, the manufactured granules A and B from Quarry 1 and/or Quarry 2 may be transported to at least one shingle manufacturing facility or plant. As shown at 110 in FIG. 2, the manufactured granules A and B which originated at Quarry 1 and/or Quarry 2 can be transported to a first and/or a second shingle manufacturing plant (labeled Plant 1 and Plant 2, respectively, in FIG. 2). If desired, Plant 1 and Plant 2 can be located in different geographic regions of the United States, or different geographic regions of the world. As described herein above, the manufactured granules A are substantially identical in color and therefore can be used interchangeably at any desired shingle manufacturing plant, such as Plant 1 and/or Plant 2. Likewise, the manufactured granules B are substantially identical in color and therefore can be used interchangeably at any desired shingle manufacturing plant, such as Plant 1 and/or Plant 2. It will be understood that the manufactured granules A and B can be transported to any desired number of shingle manufacturing plants, such as one plant or more than two plants.

In a fifth step 110 of the system 100, a granule covered roofing shingle is manufactured using the manufactured granules A and B. The manufactured granules A and B can be used to form any desired number of color blends of granules. As described herein above, a granule covered roofing shingle $S_1$ produced at Plant 1 may include any combination of manufactured granules A and/or B from any of Quarry 1 and/or Quarry 2. Likewise, a granule covered roofing shingle $S_2$ produced at Plant 2 may include any combination of manufactured granules A and/or B from any of Quarry 1 and/or Quarry 2. Additionally, a shingle $S_1$ produced at Plant 1 and a shingle $S_2$ produced at Plant 2 may include any quantity and/or combination of the manufactured granules A and/or B from any of Quarry 1 and/or Quarry 2 within any color blend of granules. It will therefore be understood that the granules $A_1$ and $A_2$ can be used interchangeably. Likewise, the granules $B_1$ and $B_2$ can be used interchangeably.

The use of the manufactured granules A and/or B ensures that a color of a color blend of granules created with the manufactured granules A and/or B at Plant 1 can be substantially identical to a color of a color blend of granules created with the manufactured granules A and/or B at Plant 2. The ability to ensure such substantially identical color blends of granules at a plurality of shingle manufacturing plants further provides that a color of the granule covered roofing shingle $S_1$ produced at Plant 1 can be produced to be substantially identical to a color of the granule covered roofing shingle $S_2$ produced at Plant 2.

A color measuring device, such as a colorimeter, can be used to sense the shingles $S_1$ and $S_2$ to ensure that they are substantially identical. As used herein, the color of the shingles $S_1$ and $S_2$ will be considered substantially identical if the total color difference $\Delta E$ between the shingles $S_1$ and $S_2$ is within the range of about +/-2.8 $L^*a^*b^*$ color units. In a particular embodiment, the $\Delta E$ between the colors of the shingles $S_1$ and $S_2$ is within the range of about +/-2.0 $L^*a^*b^*$ color units. In another embodiment, the $\Delta E$ between the colors of the shingles $S_1$ and $S_2$ is within the range of about +/-1.3 $L^*a^*b^*$ color units.

Additionally, an observer test can be used to ensure that the color of the granule covered roofing shingle $S_1$ produced at Plant 1 is substantially identical to the color of the granule covered roofing shingle $S_2$ produced at Plant 2. In such an observer test, samples of the shingles $S_1$ and $S_2$ can be visually observed by an observer to ensure that the color of the shingle $S_1$ produced at Plant 1 is substantially identical to the color of the granule covered roofing shingle $S_2$ produced at Plant 2.

In a sixth step 112 of the system 100, the granule covered roofing shingles $S_1$ and $S_2$ are provided to a customer, such as a contractor or a homeowner, for use on a building roof. Because the color of the granule covered roofing shingles $S_1$ and $S_2$ is substantially identical, the shingles $S_1$ and $S_2$ from any of the shingle manufacturing plants, Plant 1 and/or Plant 2, can be combined or used interchangeably on a roof in an esthetically pleasing manner such that an observer will perceive the color of the shingles $S_1$ and $S_2$ as being substantially identical.

Advantageously, any of the shingles $S_1$ and/or $S_2$ may include granules from quarries in different geographic regions of the United States or the world. If the standardized process for manufacturing granules is followed, the manufactured granules, such as the manufactured granule A, will be substantially identical in color and therefore can be used interchangeably at any desired shingle manufacturing plant, regardless of the geographic origin of the granules. Further, if the standardized process for manufacturing granules is followed, the shingles $S_1$ and/or $S_2$ may be produced at a plurality of geographically separated manufacturing plants. Accordingly, the shingles $S_1$ and $S_2$ can have a color that does not vary, regardless of where the granules A and/or B originated. Additionally, because shingles $S_1$ and/or $S_2$ have a substantially identical color, the shingles $S_1$ and/or $S_2$ may be used interchangeably at any desired geographic location in the nation. Such shingles $S_1$ and $S_2$, may therefore be considered as having a national shingle color interchangeably usable at any geographic location.

Figure 3:
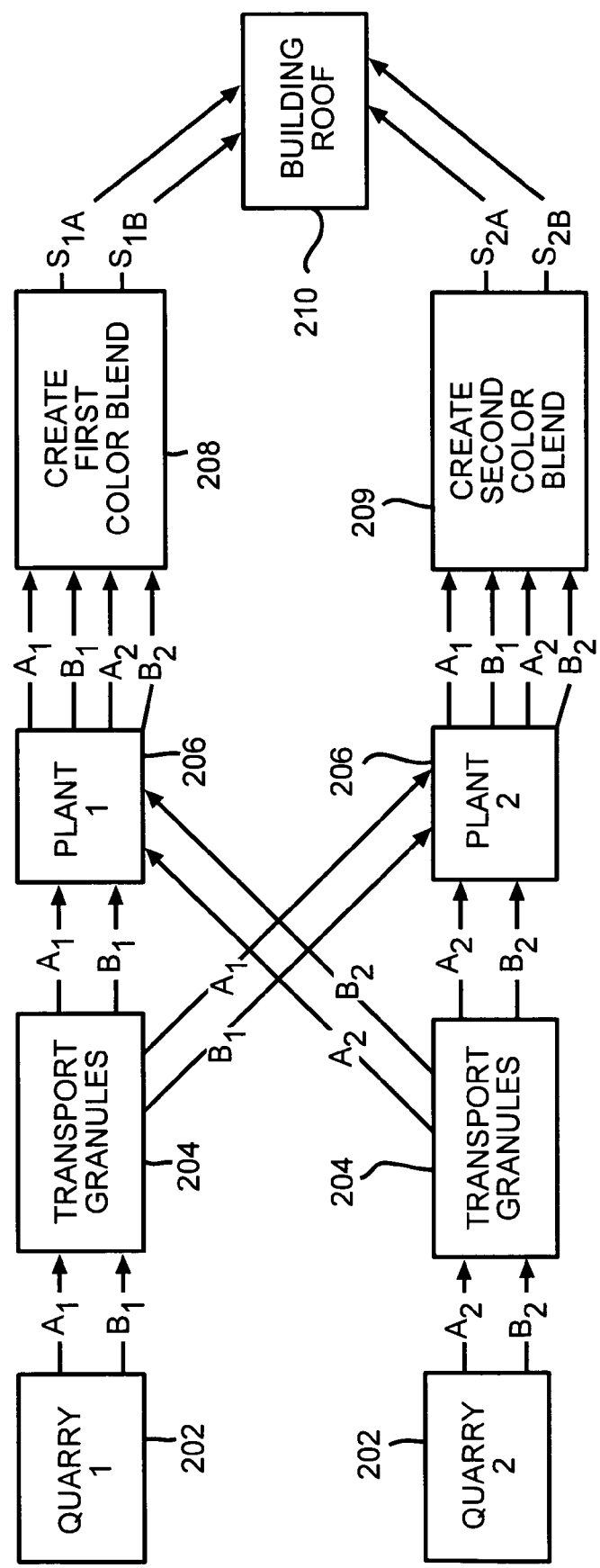
FIG. 3 is a flow chart of a second embodiment of a system for manufacturing a granule covered roofing shingle in accordance with the system of this invention.

Referring now to FIG. 3, there is illustrated a flow chart of a second embodiment of a system, indicated generally at 200, for manufacturing a granule covered roofing shingle in accordance with this invention. In a first step 202 of the system 200, at least two sources of granules are established. The sources of granules may be geographically separated granule quarries, such as quarries in different geographic regions of the United States, or different geographic regions of the world. However, the sources of granules may be any other desired source of a suitable granule. Additionally, although the sources of granules illustrated in FIG. 3 are shown as being geographically separated granule quarries (labeled Quarry 1 and Quarry 2 in FIG. 3), the sources of granules may also be different portions of the same quarry, or any desired number of geographically separated quarries, or portions thereof. It will be understood however, that Quarry 1 and Quarry 2 can provide any desired number of granules from any desired number of quarries, such as one granule or more than two granules, and more than two quarries. In the embodiment illustrated in FIG. 3, Quarry 1 provides a first granule $A_1$ and a second granule $B_1$, and Quarry 2 provides a first granule $A_2$ and a second granule $B_2$, wherein the first granules $A_1$ and $A_2$ are of a first color, and the second granules $B_1$ and $B_2$ are of a second color.

In a second step 204 of the system 200, the granules $A_1$, $B_1$, $A_2$, and $B_2$ from Quarry 1 and Quarry 2, respectively, may be transported to at least one shingle manufacturing facility or plant. As shown at 206 in FIG. 3, the granules $A_1$ and $B_{11}$ which originated at Quarry 1 can be transported to a first and/or a second shingle manufacturing plant (labeled Plant 1 and Plant 2, respectively, in FIG. 3). Likewise, the granules $A_2$ and $B_2$, which originated at Quarry 2 can be transported to a first and/or a second shingle manufacturing plant. If desired, Plant 1 and Plant 2 can be located in different geographic regions of the United States, or different geographic regions of the world. It will be understood that the granules $A_1$, $B_1$, $A_2$, and $B_2$ can be transported to any desired number of shingle manufacturing plants, such as one plant or more than two plants.

In a third step 208 of the system 200, the granules $A_1$ and $B_1$ may be combined at Plant 1 to form a first color blend. A granule covered roofing shingle $S_{1A}$ is then manufactured using the first color blend. The granules $A_2$ and $B_2$ may also be combined at Plant 1 to form the first color blend and, subsequently, a granule covered roofing shingle $S_{1B}$. The granule covered roofing shingle $S_{1A}$ produced at Plant 1 and having the first color blend formed from the granules $A_1$ and $B_1$ may therefore be substantially identical in color and appearance to the granule covered roofing shingle $S_{1B}$ produced at Plant 1 and having the first color blend formed from the granules $A_2$ and $B_2$. Accordingly, the shingles $S_{1A}$ and $S_{1B}$ can be used interchangeably on a roof, as shown at 210 of the system 200.

Likewise, the granules $A_2$ and $B_2$ may be combined at Plant 2 to form a second color blend, as shown at 209 in FIG. 3. A granule covered roofing shingle $S_{2A}$ is then manufactured using the second color blend. The granules $A_1$ and $B_1$ may also be combined at Plant 2 to form the second color blend and, subsequently, a granule covered roofing shingle $S_{2B}$. The granule covered roofing shingle $S_{2B}$ produced at Plant 2 and having the second color blend formed from the granules $A_1$ and $B_1$ may therefore be substantially identical in color and appearance to the granule covered roofing shingle $S_{2A}$ produced at Plant 2 and having the second color blend formed from the granules $A_2$ and $B_2$. Accordingly, the shingles $S_{2A}$ and $S_{2B}$ can be used interchangeably on a roof, as shown at 210 of the system 200.

It will be understood that the first color blend ($A_1$ and $B_1$) of the shingle $S_{1A}$ may include any combination of additional granules so as to ensure that the shingle $S_{1A}$ is substantially identical in color and appearance to the shingle $S_{1B}$. The first color blend ($A_2$ and $B_2$) of the shingle $S_{1B}$ may also include any combination of additional granules so as to ensure that the shingle $S_{1B}$ is substantially identical in color and appearance to the shingle $S_{1A}$.

Likewise, the second color blend ($A_2$ and $B_2$) of the shingle $S_{2A}$ may include any combination of additional granules so as to ensure that the shingle $S_{2A}$ is substantially identical in color and appearance to the shingle $S_{2B}$. The second color blend ($A_1$ and $B_1$) of the shingle $S_{2B}$ may also include any combination of additional granules so as to ensure that the shingle $S_{2B}$ is substantially identical in color and appearance to the shingle $S_{2A}$. One skilled in the art appreciates the invention is not limited strictly as described, and may further include further permutations of color blends, such as (A1 and B2), (A2 and B1), etc.

The ability to ensure such substantially identical color blends of granules at a manufacturing plant, regardless of the source of the component granules, provides significant flexibility for the manufacturing plant.

A color measuring device, such as a calorimeter, or an observer test, as described herein above, can be used to ensure that shingles, such as the shingles $S_{1A}$ and $S_{1B}$, from a single manufacturing plant, such as Plant 1, are substantially identical to one another. For example, the color of the first color blend ($A_1$ and $B_1$) of the shingle $S_{1A}$ and the color of the first color blend ($A_2$ and $B_2$) of the shingle $S_{1B}$ will be considered substantially identical if the total color difference $\Delta E$, as defined above, between the shingle $S_{1A}$ and the shingle $S_{1B}$ is within the range of about +/−2.8 $L^*a^*b^*$ color units.

In a particular embodiment, the $\Delta E$ between the colors of the shingle $S_{1A}$ and the shingle $S_{1B}$ is within the range of about +/−2.0 $L^*a^*b^*$ color units. In another embodiment, the $\Delta E$ between the colors of the shingle $S_{1A}$ and the shingle $S_{1B}$ is within the range of about +/−1.3 $L^*a^*b^*$ color unit.

The principle and mode of operation of this invention have been described in its various embodiments. However, it should be noted that this invention may be practiced otherwise than as specifically illustrated and described without departing from its scope.

What is claimed is:

1. A method for manufacturing a granule covered roofing shingle comprising:

establishing at least two sources of granules;

manufacturing coated granules from the at least two sources of granules;

establishing a standardized process for manufacturing granules having a standardized appearance, the standardized process including the steps of selecting a uniform color scale value and selecting coated granules that have a color substantially identical to the uniform color scale value, wherein the coated granules are selected from one or more of the sources of granules;

transporting the coated granules to more than one shingle manufacturing facility;

manufacturing a first granule covered roofing shingle using the coated granules at a first facility;

manufacturing a second granule covered roofing shingle using the coated granules at a second facility;

sensing the color of the first and second roofing shingle; and determining whether the colors of the first roofing shingle and the second roofing shingle are within an acceptable limit of about 2.8 $L^*a^*b^*$ color units of each other.

2. The method of claim 1 wherein the step of establishing a standardized process includes:

sensing a color scale value of each of the coated granules; and calculating a total color difference ($\Delta E$) between the coated granules from each of the sources of granules, such that the total color difference ($\Delta E$) is within the range of about +/−2.5 $L^*a^*b^*$ color units.

3. The method of claim 1 wherein the step of establishing a standardized process includes:

sensing a color of the coated granules from each of the sources of granules;

comparing the sensed color of the coated granules from one of the sources of granules to the sensed color of the coated granules from another of the sources of granules;

calculating a total color difference ($\Delta E$) between the sensed colors of the coated granule from each of the at least two sources of granules; and selecting the coated granules from at least one of the sources of granules after determining that the total color difference ($\Delta E$) is within a predetermined range.

4. The method of claim 3 including selecting one of the granules after determining that the total color difference ($\Delta E$) is within the range of about +/−2.5 $L^*a^*b^*$ color units.

5. The method of claim 1 wherein the step of establishing a standardized process includes:

visually observing a color of the coated granules from each of the sources of granules;

visually comparing the observed color of the coated granules from one of the sources of granules to the observed color of the coated granules from another of the sources of granules; and selecting the first coated granules from observed granules appear to be substantially identical.

6. The method of claim 1 further including the step of using shingles from each of the at least two shingle manufacturing facilities interchangeably on a roof.

7. The method of claim 1 wherein the system of manufacturing a granule covered roofing shingle includes using the manufactured granules to define a blend drop.

8. The method of claim 1 wherein a blend drop defined by the coated granule at one of the facilities has an appearance substantially identical to the appearance of the blend drop defined by a manufactured granule at another one of the facilities.

9. A method for manufacturing a granule covered roofing shingle comprising:

establishing at least two sources of granules;

manufacturing coated granules from the at least two sources of granules;

establishing a standardized process for manufacturing granules having a standardized appearance, wherein a color of the coated granules from one of the sources of granules is substantially identical to the color of the coated granules from the others of the sources of granules, thereby defining at least one uniform color scale value;

manufacturing a first granule covered roofing shingle using the coated granules at a first facility;

manufacturing a second granule covered roofing shingle using the coated granules at a second facility;

sensing the color of the first and second roofing shingle;

determining whether the colors of the first roofing shingle and the second roofing shingle are within an acceptable limit of about 2.8 $L^*a^*b^*$ color units of each other; and using the first and second manufactured shingles interchangeably on a roof.

10. The method of claim 9 wherein the first roofing shingle has an appearance substantially identical to the appearance of the second roofing shingle.

* * * * *